United States Patent
Duroux et al.

(10) Patent No.: US 7,455,414 B2
(45) Date of Patent: Nov. 25, 2008

(54) EXTERIOR VEHICLE MIRROR THAT COMPENSATES AS MIRROR ASSEMBLY EXTENDS FROM VEHICLE

(75) Inventors: Bernard Duroux, Garancieres (FR); Daniel Dumont, Veneux les Sablons (FR)

(73) Assignee: Visiocorp Patents S.a.r.l., Luxembourg (LU)

( * ) Notice: Subject to any disclaimer, the term of this patent is extended or adjusted under 35 U.S.C. 154(b) by 62 days.

(21) Appl. No.: 11/725,663

(22) Filed: Mar. 20, 2007

(65) Prior Publication Data
US 2007/0221812 A1    Sep. 27, 2007

Related U.S. Application Data

(60) Provisional application No. 60/784,436, filed on Mar. 21, 2006.

(51) Int. Cl.
*B60R 1/078* (2006.01)

(52) U.S. Cl. .................. 359/841; 359/843; 248/480

(58) Field of Classification Search ............... 359/841, 359/843, 872; 248/476, 479, 480
See application file for complete search history.

(56) References Cited

U.S. PATENT DOCUMENTS

| | | | | |
|---|---|---|---|---|
| 2,839,965 A | * | 6/1958 | Budreck | 248/480 |
| 3,836,235 A | * | 9/1974 | Russell | 359/605 |
| 4,558,930 A | * | 12/1985 | Deedreek | 359/841 |
| 4,730,913 A | * | 3/1988 | Boothe | 359/881 |
| 5,483,385 A | * | 1/1996 | Boddy | 359/841 |
| 5,629,810 A | * | 5/1997 | Perry et al. | 359/872 |
| 5,984,483 A | * | 11/1999 | Mazurek et al. | 359/872 |
| 6,109,755 A | | 8/2000 | Duroux et al. | |
| 6,139,159 A | * | 10/2000 | Whitehead | 359/841 |
| 6,213,609 B1 | * | 4/2001 | Foote et al. | 359/841 |
| 6,598,983 B1 | * | 7/2003 | Boddy | 359/841 |
| 6,896,385 B2 | * | 5/2005 | Foote | 359/877 |
| 2004/0080839 A1 | * | 4/2004 | McPherson et al. | 359/841 |
| 2004/0246608 A1 | * | 12/2004 | Wellington et al. | 359/877 |

FOREIGN PATENT DOCUMENTS

| EP | 0 713 804 A1 | 5/1996 |
|---|---|---|
| EP | 0 879 738 A2 | 11/1998 |

* cited by examiner

*Primary Examiner*—Alessandro Amari
*Assistant Examiner*—Mark Consilvio
(74) *Attorney, Agent, or Firm*—Reising Ethington, P.C.

(57) ABSTRACT

A retractable mirror assembly for a vehicle which retracts towards and extends away from a vehicle body wherein the mirror compensates for the change in position so that the same perspective is maintained. The mirror assembly comprises the vehicle body in which a mirror housing that surrounds a mirror backing plate having a mirror glass is retracted and expanded to and from the vehicle body. A second support bracket and a stationary bracket are connected and move in relation to one another in order to rotate the mirror backing plate and mirror so that the mirror maintains the same perspective while the mirror assembly is being retracted and expanded to and from the vehicle body.

20 Claims, 2 Drawing Sheets

EXTERIOR VEHICLE MIRROR THAT COMPENSATES AS MIRROR ASSEMBLY EXTENDS FROM VEHICLE

CROSS-REFERENCE TO RELATED APPLICATIONS

This application claims priority to provisional patent application No. 60/784,436, filed Mar. 21, 2006, and titled "Retractable Mirror." The disclosure of the above application is incorporated herein by reference.

FIELD OF THE INVENTION

The present invention relates to retractable mirrors and their use in doors of motor vehicles.

BACKGROUND OF THE INVENTION

Adjustable mirrors are used on various types vehicles to adjust the position of the mirror. Having an adjustable mirror allows for, among other things, compensation for different sized drivers, and for changing the seat position inside the vehicle. When a different person operates a vehicle it may be necessary to change the position of the mirror to compensate for that person's height, or other characteristic that may affect how they view the reflection in the mirror. Also, it is common for seats to be adjustable in passenger vehicles as well. Changing the seat position will also have an effect on how the reflection is seen in the mirror. If the mirror is adjustable, these problems can be compensated for by adjusting the mirror so that the desired image is reflected in the mirror.

Another problem relevant to mirrors is that vehicles used for shipping, construction, and other industrial-type applications are often very large, and it is an advantage to have a mirror that is not only adjustable, but retractable into the vehicle body as well. The purpose of having an adjustable mirror is to allow for the vehicle to comply with packaging constraints. It is common for mirrors on large vehicles, such as trucks, to be prohibited from extending outwardly from the vehicle. Thus, the retractable mirror allows the vehicle to comply with the regulations since the retractable mirror does not extend outwardly from the vehicle.

Furthermore, mirrors that extend outwardly, beyond the width of the vehicle's frame, can prevent the vehicle from accessing certain locations, such as a garage. Thus, the vehicle can fit into tight spaces, such as a garage, with greater ease when the mirrors are retractable and reduce the overall width of the vehicle. In addition, mirrors cause wind resistance, which reduces the fuel efficiency of the vehicle, due to extending outwardly from the vehicle frame. The fuel efficiency can be increased by retracting the mirrors and reducing the overall width of the vehicle and thus the wind resistance.

However, when a mirror is retracted or extended outwardly from the vehicle the image in the mirror is changed. Thus, after the vehicle occupant has adjusted the mirror they are hesitant to retract or expand the mirror because the mirror image is altered and the mirror must be readjusted. Therefore, it is desirable to develop a retractable/expandable mirror assembly that maintains the same image in the mirror as the mirror is being retracted or expanded.

SUMMARY OF THE INVENTION

The present invention relates to a retractable mirror assembly for a vehicle which retracts towards and extends away from a vehicle body. As the mirror retracts or expands, the mirror assembly compensates for the change in viewing range of the mirror by changing the angle of the viewing surface as the mirror retracts or expands so as to allow for what is seen in the mirror to remain constant.

The present invention accomplishes this compensation for change in viewing angle by pivoting the mirror about a vertical axis at the center of the mirror as it retracts toward the vehicle. The mirror is supported by a first support bracket at which the mirror can pivot about a vertical axis. Mounted on the backing plate on the portion of the backing plate closest to the side of the vehicle is another support bracket which has a groove. The groove is used in conjunction with a roller pin. The roller pin is stationary, with respect to the backing plate. As the mirror is retracted, the roller pin slides through the groove and the groove is configured such that as the mirror changes position, the mirror rotates about its vertical axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
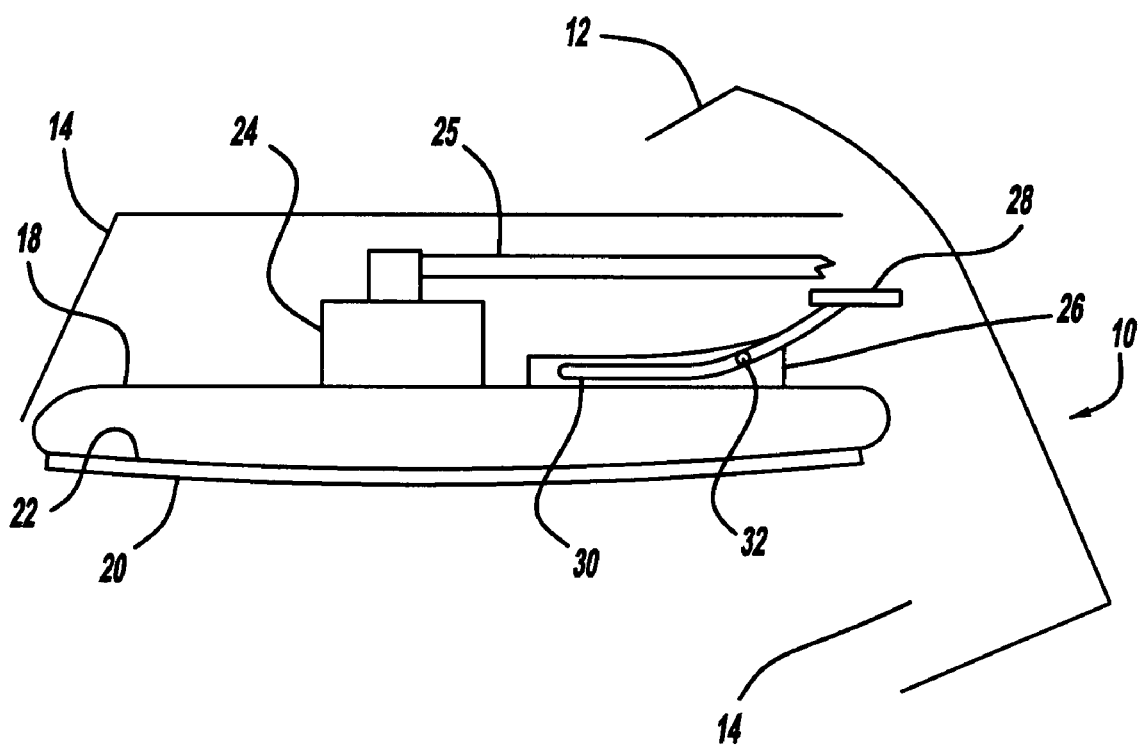
FIG. 1 is a plan view of a preferred embodiment of a mirror assembly.

Referring to FIG. 1, an exterior mirror assembly for a motor vehicle is generally shown at 10. A vehicle body 12 has an inlet 14 in which a mirror housing 16 is inserted and removed from the inlet 14. Thus, the mirror housing 16 is received and projects from the vehicle body 12. The mirror housing 16 encloses a mirror backing plate 18 which has a reflective element or mirror glass 20 mounted on a exterior side 22 of the mirror backing plate 18. In a preferred embodiment, the mirror housing 16 encloses all sides of the mirror backing plate 18 except for the side of the exterior side 22 on the mirror backing 16. Thus, the mirror glass 20 that is mounted to the exterior side 22 is visible and not enclosed by the mirror housing 16. In a preferred embodiment, the mirror housing 16 is made of a material with adequate strength to withstand the forces applied to an exterior vehicle mirror. Similarly, the mirror backing plate 18 is preferably made of a material with adequate strength to support other components of the mirror assembly 10, described below.

A first support bracket 24 is mounted to the mirror backing plate 18. In a preferred embodiment, the first support bracket 24 is mounted to the center of the mirror backing plate 18 in order to give the mirror glass 20 the maximum amount of support. An arm 25 is connected to the first support bracket, such that the arm 25 retracts and expands the mirror assembly 10 into and from the vehicle body 12 through the inlet 14. Thus, the arm 25 is operably connected to a device (not shown) in the vehicle body 12 which changes the position of the arm 25. In a preferred embodiment, the arm 25 telescopically expands and retracts upon itself as the arm 25 moves the mirror housing 14. However, the arm 25 can also have hollow cylindrical piece so that electrical wiring for mirror lights (not shown), a mirror heater (not shown), or similar components extend through an axial bore (not shown) in order for the components to be electrically connected to the vehicle's electrical system. Preferably, the mirror housing 16 is connected to the first support bracket 24 so that the mirror housing 16 moves with the first support bracket 24 as the arm 25 is extended and retracted. The mirror housing 24 can also be connected to the portion of the arm 25 that is not telescopically retracted into the arm 25.

In addition, a second support bracket 26 is mounted to the mirror backing plate 18. In a preferred embodiment, the second support bracket 26 is mounted to the mirror backing plate 18 between the first support bracket 24 and the vehicle body 12. Thus, the second support bracket 26 is mounted on the same side as the mirror backing plate 18 as the first support bracket 24. However, the second support bracket 26 can be mounted anywhere on the mirror backing plate 18 so long as the remaining components of the mirror assembly 10 are configured accordingly.

Moreover, a stationary bracket 28, which is separate from the mirror backing plate 18, is connected to the second support bracket 26. The second support bracket 26 and the stationary bracket 28 move in relation to one another so that the mirror glass 20 changes positions when the mirror housing 16 is inserted or removed from the vehicle's body 12. As the arm 25 moves with respect to the vehicle body 12, the mirror housing 16 also moves with respect to the vehicle body 12. As the position of the mirror housing 16 is altered, the angle of the mirror glass 20 with respect to the mirror backing plate 16 is changed. Therefore, the image in the mirror glass 20 remains the same when the mirror housing 16 changes positions.

In a first embodiment, the second support bracket 26 has a groove 30 which extends along the length of the second support bracket 26. The stationary bracket 28 has a roller pin 32 at the end of an extension 30 of the stationary bracket 28. The extension 30 extends from the bracket 28 and contacts the second support bracket 26, such that the groove 30 accepts the roller pin 32. Thus, the roller pin 32 slides along the groove 30 when the second support bracket 26 and the stationary bracket 28 move in relation to one another as the arm 25 retracts or expands the mirror assembly into or from the vehicle body 12. In a preferred embodiment, the groove 30 is shaped so that the angle of the mirror glass 20 will be altered as the mirror housing 16 is inserted or removed from the vehicle body 12. Thus, the image reflected in the mirror glass 20 will not be altered as the mirror housing 16 is changing position. In order for the mirror glass 20 to reflect the same image as the mirror assembly 10 is being retracted or expanded, the mirror glass 20 moves about a vertical axis of the first support bracket 24 while the roller pin 32 slides along the groove 30. In a preferred embodiment, the groove 30 is shaped so that the angle of the mirror glass 20 will be altered approximately 3° as the mirror assembly 10 moves into and out of the vehicle body 12. Thus, the angle alteration of 3° is sufficient to maintain the same image in the mirror while the mirror assembly 10 is being moved.

Figure 2:
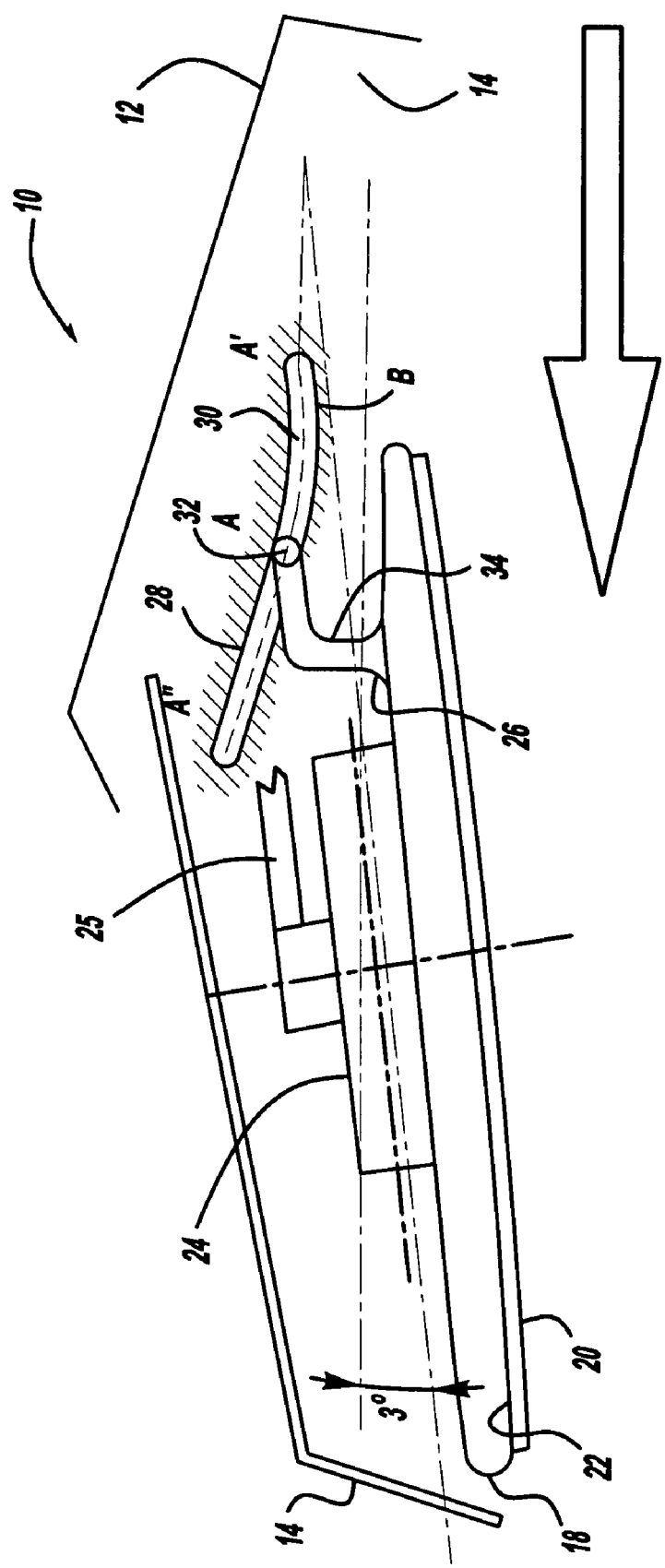
FIG. 2 is a plan view of an alternate embodiment of the mirror assembly.

In an alternate embodiment of the invention shown in FIG. 2, the exterior mirror assembly for a motor vehicle 10 also comprises of a first support bracket 24, a second support bracket 26, and a stationary bracket 28. However, in this embodiment the second support bracket 26 has an extension 34 that extends from the back of the mirror backing plate 18 towards the arm 25. At the end of the extension 34, the second support bracket 26 has a roller pin 32 which connects to the stationary bracket 28 in the groove 30. Thus, the groove 30 of the stationary bracket 28 has a groove 30 which accepts the roller pin 32, and the roller pin 32 slides along the groove 30 as the mirror assembly 10 is changing positions. Similar to the embodiment described above, the groove 30 has a particular shape so that as the roller pin 32 slides about the groove 30 the second support bracket 26 will cause the mirror glass 20 to change positions in order to maintain the same image while the mirror assembly 10 is being moved.

Therefore, the mirror glass 20 maintains the same image or view perspective as the mirror assembly 10 changes positions with respect to the vehicle body 12. As the arm 25 moves the first support bracket 24, the first support bracket 24 moves the mirror backing plate 18. As the mirror backing plate 18 moves the stationary bracket 28 causes the second support bracket 26 to move in a particular direction. This is caused by the roller pin 32 sliding along the groove 30 which is formed in a particular shape in order to cause the mirror backing plate 18 to move in the particular direction. Thus, the mirror backing plate 18 and the mirror glass 20 move along a vertical axis of the first support bracket 24 in order to maintain the same view perspective.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exterior mirror for a vehicle comprising:
   a vehicle body;
   a housing adapted for being extended and retracted from said vehicle body;
   a backing plate having a reflective element on one side, wherein said backing plate is inside said housing;
   a first support bracket connected to said backing plate, wherein said first support bracket is operably connected to said vehicle body in order to alter the position of said housing with respect to said vehicle body;
   a second support bracket mounted to said backing plate, wherein said second support bracket has a groove; and
   a stationary bracket operably connected to said second support bracket by a connector, wherein said connector is slidable in said groove to alter the position of said backing plate as said housing extends and retracts.

2. The exterior mirror for a vehicle of claim 1, wherein said backing plate pivots on a vertical axis of said first support bracket when changing positions in order to maintain the same view perspective.

3. The exterior mirror for a vehicle of claim 1, wherein said connector on said stationary bracket is a roller pin which moves along said groove on said second support bracket.

4. The exterior mirror for a vehicle of claim 1, wherein movement of said backing plate is dependent upon the shape of said groove.

5. The exterior mirror for a vehicle of claim 1, wherein said second support bracket is on said backing plate between said first support bracket and said vehicle body.

6. The exterior mirror for a vehicle of claim 1 further comprising an arm that connects said first support bracket and said vehicle body, wherein said arm is telescopically connected to said vehicle body so that the length of said arm varies as said housing is retracted and extended from said vehicle body.

7. The exterior mirror for a vehicle of claim 6, wherein when said housing is extended, the length of said arm is increased, and when said housing is retracted, the length of said arm is decreased.

8. An exterior mirror for a vehicle comprising:
a vehicle body;
a housing adapted for being extended and retracted from said vehicle body;
- a backing plate having a reflective element on one side, wherein said backing plate is inside said housing;
- a first support bracket connected to said backing plate, wherein said first support bracket is operably connected to said vehicle body in order to alter the position of said mirror housing with respect to said vehicle body;
- an arm telescopically connecting said first support bracket and said vehicle body, wherein the length of said arm alters when said backing plate is extended and retracted from said vehicle body;
- a second support bracket mounted to said backing plate, wherein said second support bracket has a groove; and
- a stationary bracket operably connected to said second support bracket by a roller pin, wherein said roller pin is slidable in said groove to alter the position of said backing plate as said housing extends and retracts.

9. The exterior mirror for a vehicle of claim 8, wherein said backing plate pivots on a vertical axis of said first support bracket when changing positions in order to maintain the same view perspective.

10. The exterior mirror for a vehicle of claim 8, wherein movement of said bracket plate is dependent upon the shape of said groove.

11. The exterior mirror for a vehicle of claim 8, wherein said second support bracket is on said backing plate between said first support bracket and said vehicle body.

12. The exterior mirror for a vehicle of claim 8, wherein when said housing is retracted, the length of said arm is decreased and said housing is accepted by said vehicle body.

13. The exterior mirror for a vehicle of claim 8, wherein when said housing is extended the length of said arm is increased and said housing is deployed from said vehicle body.

14. An exterior mirror for a vehicle comprising:
a vehicle body;
a housing adapted for being extended and retracted from said vehicle body;
- a backing plate having a reflective element on one side, wherein said backing plate is inside said mirror housing;
- a first support bracket connected to said backing plate, wherein said first support bracket is operably connected to said vehicle body in order to alter the position of said housing with respect to said vehicle body;
- a stationary bracket having a groove, wherein said stationary bracket is operably connected to said backing; and
- a second support bracket mounted to said backing plate and is operably connected to said stationary bracket by a connector, wherein said connector is slidable in said groove to alter the position of said backing plate as said housing extends and retracts.

15. The exterior mirror for a vehicle of claim 14, wherein said backing plate pivots on a vertical axis of said first support bracket when changing positions in order to maintain the same view perspective.

16. The exterior mirror for a vehicle of claim 14, wherein said connector on said second support bracket is a roller pin which slides along said groove on said stationary bracket.

17. The exterior mirror for a vehicle of claim 14, wherein movement of said second support bracket with respect to said stationary bracket to alter the position of said backing plate is dependent upon the shape of said groove.

18. The exterior mirror for a vehicle of claim 14, wherein said second support bracket is on said backing plate between said first support bracket and said vehicle body.

19. The exterior mirror for a vehicle of claim 14 further comprising an arm that connects said first support bracket and said vehicle body, wherein said arm is telescopically connected to said vehicle body so that the length of said arm varies as said housing is retracted and extended from said vehicle body.

20. The exterior mirror for a vehicle of claim 19, wherein when said housing is extended, the length of said arm is increased, and when said housing is retracted, the length of said arm is decreased.

* * * * *